United States Patent [19]

Spitz

[11] Patent Number: 5,384,864
[45] Date of Patent: Jan. 24, 1995

[54] METHOD AND APPARATUS FOR AUTOMATIC DETERMINATION OF TEXT LINE, WORD AND CHARACTER CELL SPATIAL FEATURES

[75] Inventor: A. Lawrence Spitz, Palo Alto, Calif.

[73] Assignees: Xerox Corporation, Stamford, Conn.; Fuji Xerox Co., Ltd., Tokyo, Japan

[21] Appl. No.: 47,514

[22] Filed: Apr. 19, 1993

[51] Int. Cl.⁶ .............................................. G06K 9/34
[52] U.S. Cl. .......................................... 382/9; 382/45; 382/48
[58] Field of Search .................. 382/9, 48, 18, 27, 41, 382/44, 45

[56] References Cited

U.S. PATENT DOCUMENTS

| | | | |
|---|---|---|---|
| 3,613,080 | 10/1971 | Angeloni et al. | 340/146.3 AC |
| 4,173,015 | 10/1979 | Owens et al. | 340/146.3 H |
| 4,206,442 | 6/1980 | Miyazaki et al. | 340/146.3 |
| 4,377,803 | 3/1983 | Lotspiech et al. | 382/9 |
| 4,516,265 | 5/1985 | Kizu et al. | 382/48 |
| 4,594,732 | 6/1986 | Tsuji | 382/9 |
| 4,899,394 | 2/1990 | Lee | 382/9 |
| 4,918,740 | 4/1990 | Ross | 382/9 |
| 5,062,141 | 10/1991 | Nakayama et al. | 382/9 |
| 5,093,868 | 3/1992 | Tanaka et al. | 382/9 |
| 5,253,307 | 10/1993 | Wayner et al. | 382/22 |

OTHER PUBLICATIONS

A. Lawrence Spitz, "Recognition Processing for Multilingual Documents", pp. 193-204.

*Primary Examiner*—Joseph Mancuso
*Attorney, Agent, or Firm*—Oliff & Berridge

[57] ABSTRACT

An automatic character cell determining apparatus automatically determines the character cells within the text image of a document. A connected component generating means generates connected components from the pixels comprising the text image. A bounding box generating means generates a bounding box surrounding each connected component. A character cell determining means for locating character cells comprising one or more connected components comprises a vertical splaying means and a horizontal splaying means for ensuring white spaces between lines and connected components, a vertical profile means for determining the vertical positions of a line, means for splitting ligatures of two or more connected components and means for generating character cells grouping together one or more connected components.

34 Claims, 7 Drawing Sheets

▌Fuji Xerox Palo Alto Laboratory
▌3400 Hillview Avenue
▌Palo Alto, CA 94304 USA

▌seized. Confidence in the international
▌monetary system was shaky enough be-
▌fore last week's action. Since 1973, the
▌nearly tenfold increase in oil prices has

FIG. 2a

▌Fuji Xerox Palo Alto Laboratory
▌3400 Hillview Avenue
▌Palo Alto, CA 94304 USA

▌seized. Confidence in the international
▌monetary system was shaky enough be-
▌fore last week's action. Since 1973, the
▌nearly tenfold increase in oil prices has

FIG. 2b

Fuji Xerox Palo Alto Laboratory
3400 Hillview Avenue
Palo Alto, CA 94304 USA seized. Confidence in the international monetary system was shaky enough before last week's action. Since 1973, the nearly tenfold increase in oil prices has

FIG. 3

Fuji Xerox Palo Alto Laboratory
3400 Hillview Avenue
Palo Alto, CA 94304 USA seized. Confidence in the international monetary system was shaky enough before last week's action. Since 1973, the nearly tenfold increase in oil prices has

FIG. 5a

Fuji Xerox Palo Alto Labo
3400 Hillview Avenue
Palo Alto, CA 94304 USA se_i_zed. Confidence in the inter_n_ational mone_ta_ry system was shaky enough before la_s_t week's action. Since 1973, the nearly tenfold _in_cr_ea_se _in_ oil pr_i_ces has

FIG. 5b

Fuji Xerox Palo Alto Labo
3400 Hillview Avenue
Palo Alto, CA 94304 USA seized. Confidence in the international monetary system was shaky enough before last week's action. Since 1973, the nearly tenfold increase in oil prices has

FIG. 5c

Fuji Xerox Palo Alto Lab
3400 Hillview Avenue
Palo Alto, CA 94304 USA seized. Confidence in the international monetary system was shaky enough before last week's action. Since 1973, the nearly tenfold increase in oil prices has

FIG. 7

METHOD AND APPARATUS FOR AUTOMATIC DETERMINATION OF TEXT LINE, WORD AND CHARACTER CELL SPATIAL FEATURES

BACKGROUND OF THE INVENTION

1. Field of the Invention

The present invention relates to a method and apparatus for automatic document recognition and, more particularly, to a method for automatically determining the text line, word and character cell spatial features within a document.

2. Description of Related Art

Optical character recognition and the use of optical character recognition to convert scanned image data into text data suitable for use in a digital computer is well known. In addition, methods for converting scanned image data into text data and the types of errors such methods generate are well known. One problem in converting scanned image data into text data lies in being able to distinguish the individual lines of text from each other, in being able to distinguish words grouping within a single line of text, in determining the vertical and horizontal extents of the character cells within a single line of text, and in properly separating ligatures or kerns between connected components in a single line of text.

SUMMARY OF THE INVENTION

It is therefore an object of the present invention to provide an optical character recognition system having improved text line, word and character cell feature recognition capabilities.

It is also an object of the present invention to automatically determine the text line, word and character cell spatial features of a document.

According to a first embodiment of the method and apparatus of the present invention, a plurality of bounding boxes surrounding a plurality of connected components of a text portion of an image of a document are generated. The bounding boxes and connected components are then splayed in the vertical direction to separate any overlaps between the bounding boxes of a current line and the bounding boxes of the lines vertically adjacent to the current line. A vertical profile of the connected components of each line is generated and the top and bottom peaks are located. Individual vertical profiles of the bottom and top positions of the connected components are generated to determine the baseline and x-line positions, respectively (if possible). Once each line of the text portion is identified, the bounding boxes and connected components are then horizontally splayed to eliminate any overlaps of the bounding boxes. For each line, a modal stroke width value of the connected components of that line is determined. The actual stroke widths of the connected components are compared to this modal stroke width. If any connected component has an actual stroke width greater than a predetermined multiple of the modal stroke width, then each such connected component is considered to be a possible ligature of two or more independent connected components. In this case, the connected components may be split. Such ligatures are recursively split until no further splits are possible. Once all possible splits have been made, the spaces between connected adjacent components are then analyzed to determine the word and character spacings of each line.

Once the text portion of the image is conditioned so that the connected components are unambiguously separated vertically and horizontally from surrounding connected components, each group of connected components which are between the top and bottom positions of each line and are vertically aligned are grouped together as a character into one character cell.

In a second preferred embodiment, if the text portion of the document needs to be converted to a representative digital data signal, the document is scanned, and all non-text information is removed. The resulting text image is then corrected for skew and other scanning artifacts (if necessary). Once the document image has been scanned and cleaned up, the image is converted from a bitmap of pixels having locations and image densities to a plurality of connected components. After generating the connected components, a bounding box is generated for each connected component.

BRIEF DESCRIPTION OF THE DRAWINGS

The invention is described in relation to the accompanying drawings, in which:

FIG. 2 shows a sample of text, and a vertical profile before and after vertical splaying;

FIG. 3 shows bounding boxes for each connected component of the document shown in FIG. 2;

FIG. 5 shows the text sample of FIG. 2 before and after horizontal splaying; and before and after connected component splitting;

FIG. 7 shows the text sample of FIG. 2 with the character cells and bounding boxes shown.

DETAILED DESCRIPTION OF THE PREFERRED EMBODIMENTS

Figure 1:
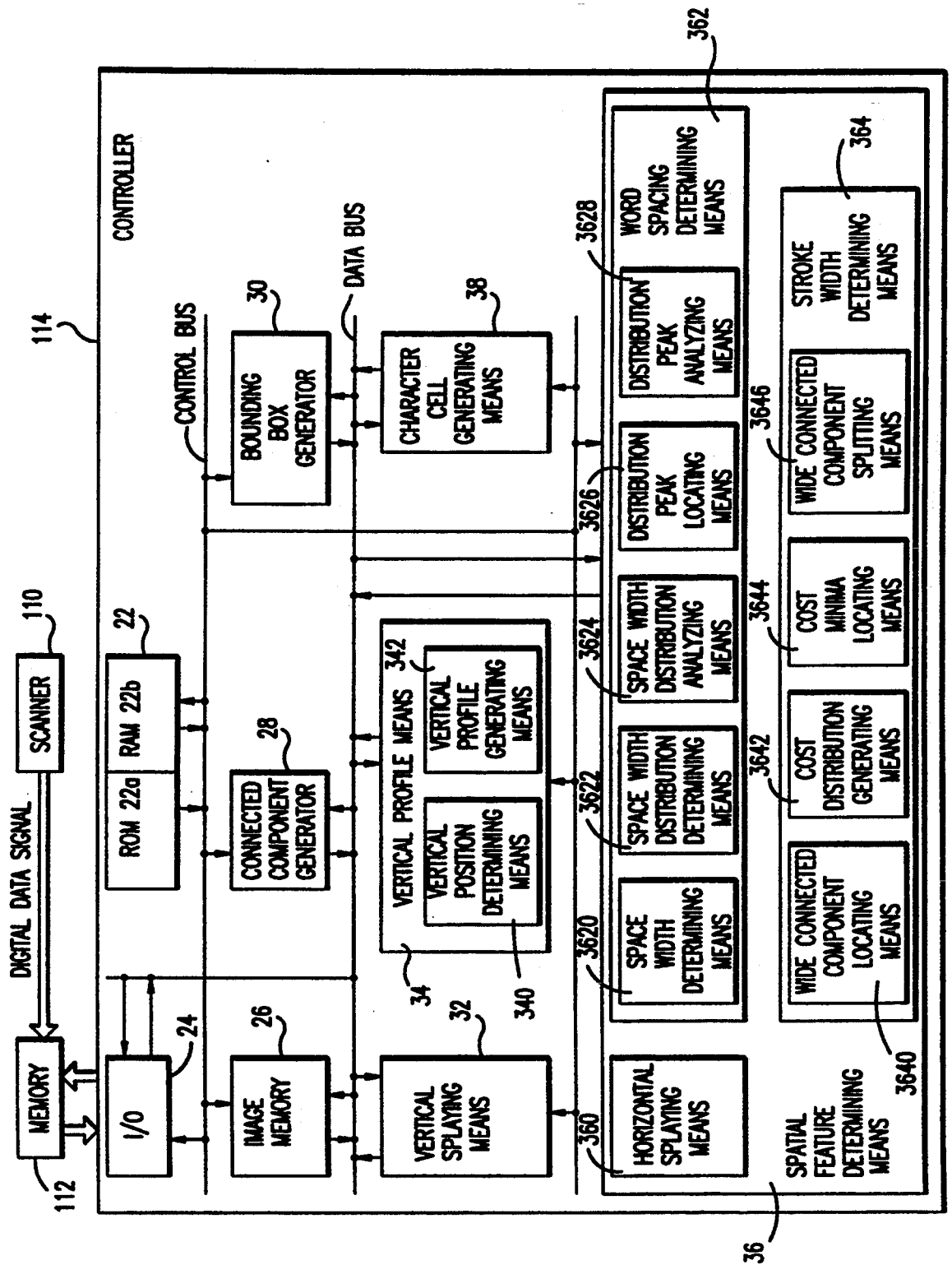
FIG. 1 shows a block diagram of an optical character recognition system.

As shown in FIG. 1, the optical character recognition system of the present invention comprises a scanner 110 having a charge coupled device (CCD) or the like. The scanner 110 scans a document 100 having an image 102, the image 102 comprising a text portion 104 of an unknown script and language. The scanner 110 outputs a digital data signal representative of the location and image density of a plurality of pixels comprising the image 102 of the original document 100. This digital data signal is sent to a memory 112, where it is stored temporarily or indefinitely. The digital data signal, when output from the memory 112, is input to a general purpose digital computer 114. Once input to computer 114, the digital data signal is first cleaned up by removing any non-text portions of the image 102 leaving the text portion 104. Further, any scanner artifacts in the digital data signal, such as skew or the like, are removed. The cleaned up digital data signal is then stored to the memory 112 or stored in a memory of the computer 114. Alternatively, the scanner can provide some of the preprocessing, such as removal of scanner artifacts.

As shown in FIG. 1, the general purpose digital computer 114 of the present invention comprises a memory 22 for storing a control program, an input/output circuit 24 for inputting the digital data signal from the memory 112 and for outputting a signal representative of the determined character cells of the text portion 104.

The general purpose computer 114 also comprises an image RAM 26 for storing the digital data signal; a connected component generating means 28 for generating connected components from the digital data signal; bounding box generating means 30 for determining the coordinates of the bounding box and the pixels of the digitized image within the bounding box for each of the connected components; a vertical splaying means 32 for vertically splaying the text portion 104; vertical profile means 34 for generating a vertical profile of the unsplayed text portion 104; word spatial feature determining means 36 for horizontally splaying the text portion 104: character cell generating means 38 for grouping connected components into character cells and for identifying character and word divisions. The vertical profile means 34 comprises a vertical profile generating means 340 for generating vertical profiles of the text portion 104, each line of the text portion 104 and portions of each line, and a vertical position determining means 342 for determining at least the top, bottom, base line and possibly the x-line positions of each line. The line spatial feature determining means 36 comprises a horizontal splaying means 360 for horizontally splaying each line of the text portion 104, word spacing determining mean 362 for determining the interword and intraword spaces within each line of the text portion 104, stroke width determining means 364 for determining the modal stroke width of each line and the actual stroke widths for each connected component of the text portion 104, and line content determining means 366 for determining which connected components belong to each line of the text portion 104. The memory 22 for storing the control program may comprise either a ROM 22a or a RAM 22b.

In operation, the document 100 containing the image 102, as shown in FIG. 1, is placed into and scanned by the scanner 110 to generate a serial or parallel digital data signal. The digital data signal comprises a plurality of signal portions, each portion representative of a corresponding pixel of the original image 102. Each pixel of the image 102 has a location in the image 102 and an image density. Accordingly, each signal portion of the digital data signal includes data representative of the location and image density of the corresponding pixel.

The digital data signal output by the scanner 110 is then stored in the memory 112. The memory 112 may comprise a RAM, a flash memory, a disk memory or the like. Regardless of the type of memory 112, the digital data signal is stored in the memory 112 in response to the location and image density data within each signal portion. Of course, it is understood that the digital data signal can be directly input to the general purpose digital computer 114, rather than into the intermediate memory 112. Alternately, the memory 112 can be incorporated into the general purpose digital computer 114. In any case, it is understood that the memory 112 is used to provide long-term storage of the image 102.

Once the operator has completed inputting documents into the scanner 110 or the system otherwise determines or is instructed that the digital data signal representative of the image 102 stored in memory 112 should be converted to text data, the digital data signal representative of the image 102 is output from the memory 112 to the general purpose computer 114. It is of course understood that a special purpose digital computer or hardwired logic circuit can be used in place of the general purpose digital computer 114.

The digital image data signal stored in the memory 112 is output to the general purpose computer 114, where it is input through the input/output means 24 to an image memory 26. Once the digital data signal has been completely stored in the image memory 26, the digital data signal is then made available to the connected component generating means 28. The connected component generating means 28 divides the digital data signal representative of the image 102 into a plurality of connected components, each connected component comprising one or more signal portions. Each connected component comprises signal portions corresponding to those pixels of the original image 102 which have a certain minimum image density and form a continuous path. Each script character generally corresponds to one connected component, as in the "F" of "Fuji" or more than one connected component, as in the "j" or "i" in "Fuji". The list of connected components generated by the connected component generating means 28 is stored in the image memory 26 and/or memory 112.

Once the connected component generating means 28 generates the plurality of connected components for the image 102 from the digital data signal, the digital data signal corresponding to the image 102 stored on the image memory 26 and the list of connected components generated by the connected component generating means 28 is output to the bounding box generating means 30.

The bounding box generating means 30 redivides the digital data signal representative of the image 102 into a plurality of bounding boxes, each bounding box containing one connected component and zero, one or more signal portions of the digital data signal located adjacent to or near the signal portions comprising the connected component. These additional signal portions corresponding to the pixels of the text portion surround each connected component. The dimensions of each bounding box are determined by the location data of the leftmost, rightmost, uppermost and bottom most signal portions comprising the corresponding connected component. Accordingly, the signal portions within the bounding box are those comprising the connected component and those signal portions having a location data placing them within the boundaries of the bounding box, regardless of their image density data. Once the list of bounding boxes and the signal portions comprising each bounding box has been generated by the bounding box generating means 36, the list of bounding boxes is input to the image memory 26 or memory 112. The lists of connected component and bounding boxes and the plurality of signal portions are output to a vertical splaying means 32.

The vertical splaying means 32 vertically splays the text portion 104 by moving the origin of each bounding box in the text portion 104 to created an abnormally large amount of white space (leading) between vertically aligned connected components, whether such splaying is needed or not. Generally, the lines within a text portion of a document are separated by a variable amount of white space or leading, the leading being defined as a linear horizontal white path between characters of the current line and the characters of the vertically adjacent lines.

Generally, Asian script-types are well behaved, and do not have ascending or descending portions of connected components. Accordingly: it is usually possible to unambiguously locate lines of text in Asian script documents without splaying. In contrast, European script- types are not well behaved, and usually have ascending and descending portions. As these ascending and descending portions often touch or merely overlap horizontally, it is sometimes difficult to unambiguously locate lines of text in European script documents without first splaying them in the vertical direction.

However, since the cost of splaying, in time consumed and processing power needed, is very low, it is simpler to vertically splay everything regardless of the script type (and preferably without first determining the script-type), rather than attempt to determine the script type and/or those particular lines needing splaying. Of course, should the cost of splaying rise, the present invention can be easily modified to include means for determining if splaying of the text portion 104 is necessary. As shown in FIG. 2, in part (a) the text portion 104 has ascendors and descendors such that the vertical profile shows no white space between lines. If $C_y$ is the original bounding box y-axis position of the origin of a bounding box surrounding a connected component, and $C_y'$ is the final bounding box y-axis position of the origin of the bounding box after splaying, $$C_y' = f(C_y + C_h/2) - C_h/2 \qquad (1)$$

where $C_h$ is the height of the connected component and $f(\ )$ is the splaying function. In the present embodiment, $f$ is a preselected, constant splaying factor f in the range of $1 < f < 5$. However, f should not be so large that the separation between vertically adjacent, related components, such as the two parts of the character "i", is not mistaken for interline leading. Preferably, $f = 1.2$.

FIG. 2 shows in part (a) a sample text portion 104, the bounding boxes surrounding each connected component of the sample text portion, and a vertical profile of the bounding boxes. It is clear from the vertical profile that the bounding box around the "j" in "Fuji" contacts the first "0" in "3400". However, after applying the above vertical splaying factor to move the origins of the "j" and "0" connected components in the vertical direction, there is an uninterrupted white space between each pair of vertically adjacent lines, as shown in part (b) of FIG. 2.

As can be seen in comparing the vertical distribution profiles of the bounding boxes of each line of text in part (a) of FIG. 2, the top or bottom of one line, vertically, can not be distinguished from the bottom or top, respectively of the previous or succeeding line. However, in part (b) the top and bottom of one line, and bottom and top of the adjacent lines can be positively established. It is important to note that while splaying shifts the relative vertical positions between the bounding boxes of one line and the bounding boxes of the vertically adjacent lines, splaying does not alter the original dimensions of the bounding boxes.

After vertically splaying the text portion 104, the vertical splaying means 32 determines which connected components and bounding boxes comprise each line of text. The lists of lines and corresponding connected components are then stored in the image memory 26 and/or the memory 112.

Figure 4:
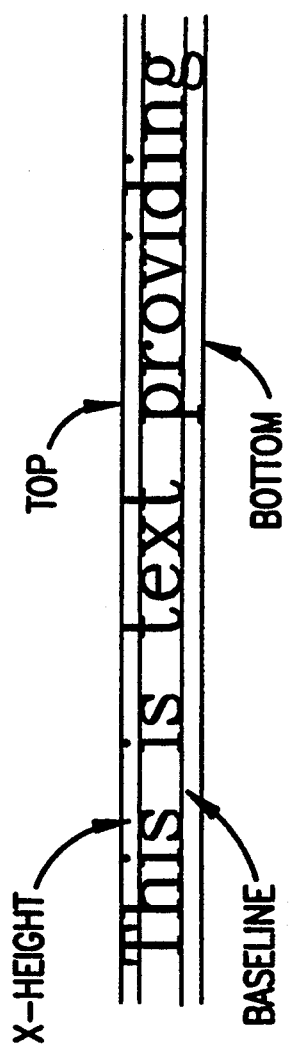
FIG. 4 shows a text string indicating the relative positions of the text line.
Figure 6:
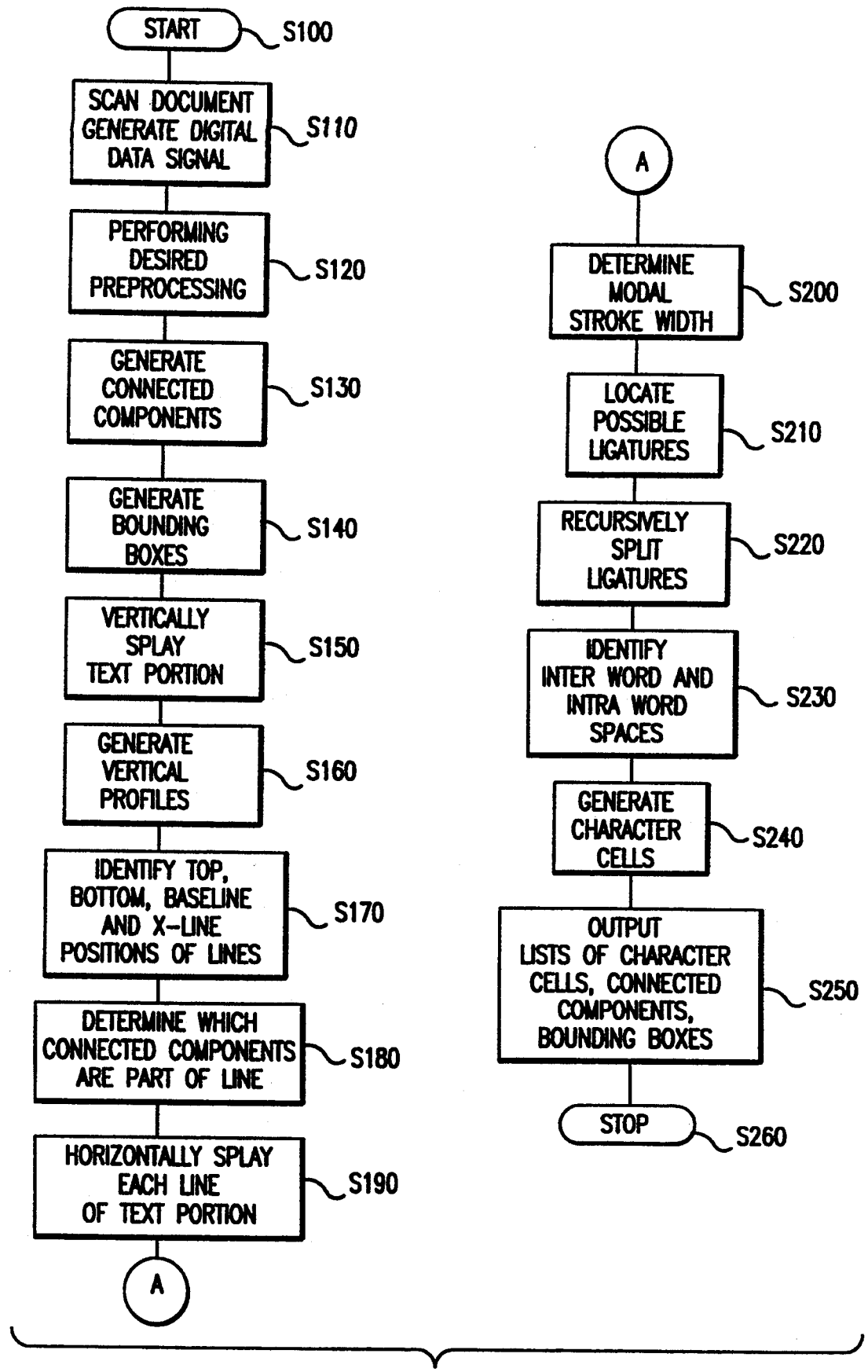
FIG. 6 a flow chart of the spatial feature determination method of the present invention.

The lists of lines and corresponding connected components, the list of connected components and the original unsplayed signal portions comprising the text portion 104 are then output to a vertical profile means 34. The vertical profile means 34 determines, for the unsplayed text portion 104, the top and bottom positions and the rightmost and leftmost positions of each line of text. The vertical profile means 34 first generates a vertical distribution profile of the connected components of each line of text. From the vertical distribution profile, the top and bottom positions of a line of text, as shown in FIG. 4, can be positively established. The vertical profile means 34 then determines the uppermost and lowermost positions of the vertical profile for each line of text. The bottom point of the text line, as shown in FIG. 4, is the lowermost point of the vertical distribution profile, while the top point of the text line, as shown in FIG. 4, is the uppermost point of the vertical profile. The vertical profile means 34 then generates two additional vertical profiles for each line of text: one of only the bottom positions of the connected components of the line, and another of only the top positions of the connected components of the line. The baseline and x-line positions will then generally be the vertical positions of the peaks of the bottom and top position vertical distribution profiles, respectively. It is possible, in a text line with no ascending or descending connected components, that the top and x-line, or bottom and baseline positions, will coincide. Further, in a text line having a high percentage of uppercase or ascending letters, it may not be possible to accurately determine the x-line position. Once all of the lines have been operated on by the vertical profile means 34, the list of lines and the bottom, top, baseline and x-line positions corresponding to each line are output to the image memory 26. The connected components corresponding to one line of text are those connected components falling entirely between the top and bottom positions. This will, of course, result in negative y-origins for many connected components in a positive-down coordinate system.

Next, the plurality of signal portions and the lists of the connected components and bounding boxes corresponding to each line of the text portion 104 are output to the word spatial feature determining means 36. The horizontal splaying means 360 of the word spatial feature determining means 36 horizontally splays the individual connected components and bounding boxes of a single line to remove any overlaps or ligatures of two or more connected components or bounding boxes corresponding to two or more independent connected components.

Generally, characters within a line of text are separated by variable amounts of white space, white space being defined as a linear vertical white path between characters within the current line. Again, as Asian script- types are usually well behaved, it is not generally necessary to horizontally splay the lines of an Asian script document to ensure that such white spaces between characters exist. In contrast, in proportionally spaced European scripts, while characters and words are usually separated by white space, the amount and distribution of white space within and between words is highly variable. It is often dependent on the font used, need not be precisely vertical to be recognized by humans, and may be deliberately omitted. Again, because of the low cost of splaying, it is generally neither necessary nor desirable to determine the script type of the text portion 104 or whether splaying of a particular line is necessary. However, as above, should the cost of splaying rise, such information could be obtained.

Pair kerns, which result in bounding box overlaps, occur often, such as the "uj" of "Fuji" or the "Av" of "Avenue" in the sample text of FIG. 2a. Further, in some fonts, intentional ligatures, or connected component overlaps occur, such as the "fi" of "confidence" in FIG. 2a. In the preferred embodiment of the present invention, the horizontal splaying means 360 horizontally splays each line of the text portion to eliminate any overlaps between adjacent bounding boxes. Then each horizontally splayed line is analyzed to locate remaining ligatures present in the line. After the located ligatures have been identified, they are analyzed to locate at most one splitting point. If a splitting point in the connected component is located, the ligature is divided into two connected components. After splaying the located ligatures, the connected components of the current line are rechecked to determine if any possible ligatures remain.

The horizontal splaying means 360 operates similarly to the vertical splaying means 32, but acts on the horizontal, rather than the vertical, positions of each bounding box of each line of text. To horizontally splay each line of text of the text portion 104, the horizontal splaying means 360 moves the origin of each bounding box of the current line of text to create a relatively large amount of white space between each pair of horizontally adjacent connected components. If $C_x$ is the original bounding box x-axis position, and $C_x'$ is the final bounding box x-axis position after splaying, $$C_x' = f/(C_y + C_{bw}/2) - C_w/2, \quad (2)$$

where $C_w$ is the width of the current connected component and $f()$ is the splaying function. In the present embodiment, $f$ is a preselected constant splaying factor $f$, in the range of $5 > f > 1$, However, $f$ should not be so large that the separation between horizontally adjacent connected components within a word is mistaken for a space between words. Accordingly, $f$ is preferably equal to 1.2.

FIG. 5 shows, in part (a) the vertically splayed text sample of FIG. 2, before horizontal splaying. The overlaps between the bounding boxes for the "u" and "j" in "Fuji" and the "A" and "v" in "Avenue" are clear, as are the unintentional ligatures of "iz" in "seized", and "in" and "rn" in "international" and the intentional ligature of "fi" in "confidence". The horizontally splayed text portion 104 is shown in part (b) of FIG. 5.

While the unintentional overlaps of bounding boxes are removed merely by splaying, the horizontal splaying is not able to remove the intentional or unintentional ligatures. These ligatures are represented by single bounding boxes, as they are identified as single connected components.

To separate the ligatures, the stroke width determining means 364 determines, for each line of text, an representative stroke width $S_w$ for that line. The average stroke width is determined by detecting the modal value of the run lengths present in the plurality of connected components associated with a particular text line. The stroke width determining means 364 comprises a wide connected component locating means 3640 for locating wide connected components over a predetermined width, cost distribution generating means 3642 for generating a cost distribution of each wide connected component cost minima locating means 3644 for locating minima within the cost distribution and a connected component splitting means 3646 for splitting a single connected component into two connected components at a located minimum.

In operation each connected component within a line having a width $C_w$ more than three times the representative stroke width $S_w$ is identified and processed. To process a connected component having a width $C_w$ at least three times the stroke width $S_w$, each column of that connected component is ANDed with each adjacent column and the number of "on" pixels of the ANDed columns is determined, to generate a cost distribution one pixel narrower than the connected component. The cost distribution is then analyzed to locate minima. For at most one minimum (preferentially the leftmost minimum if there are 2 or more minima having the same value) having a value less than the representative stroke width $S_w$ and located both more than 1.5 times the stroke width $S_w$ to the right of the left boundary and to the left of the right boundary of the corresponding bounding box the connected component is split into two connected components. This is recursively applied to each resulting fragment until all the fragments have been rechecked and resplit if necessary. As is shown in FIG. 5, part (b), if the ligature is intentional, like the "fi" in "confidence", there will often be no minimum found. In this case, the ligature will be treated as a single character.

After each line of the text portion 104 is determined, the word spacing determining means 362 determines the character and word spaces in each line of text of the text portion 104. The word spacing determining means 362 comprises line extent determining mean 3620 for determining the left and right edges of each line, space width distribution determining means 3622 for generating a distribution of the determined space widths, and space width distribution analyzing means 3624 for analyzing the space width distribution. The space width distribution analyzing means comprises distribution peak locating means 3626 for locating peaks in the space width distribution and distribution peak analyzing means 3628 for determining of the located peaks represent inter word or intra word spaces.

In operation, the beginning and ending of lines are assumed to be the beginning and ending of words. Then within a line, spaces within the horizontally splayed text between connected components are located, and a distribution curve of the widths of the spaces is generated. The widths of the spaces are measured as the distance between the rightmost edge of a left-adjacent connected component and the left most edge of a right-adjacent connected component. Generally, the distribution curve is bimodal, with peaks representing the narrow spaces between characters within words and the wide spacing between words. Of course, it is possible that one or both peaks could be missing. If the lower peak, representing intraword spacing, is missing, the text may be "set tight". The highest peak of the distribution curve of the unsplayed text portion is compared to the distribution curve of the horizontally splayed text portion. If that peak does not correspond to an inter-character-cell spacing, it is a word space. If the upper peak is missing, or corresponds to the interword spacing, it means the line of text comprises a single word.

Because the method and apparatus of the present invention are statically based, they are very robust and can withstand even a very poorly printed and/or scanned document. That is, it is not necessary for the digital data signal or the connected components generated from the digital data signal to perfectly represent every character of the document. Rather, the present invention is able to withstand such common scanning errors such as splitting a single connected component character into two or more connected components or merging two or more separate connected components into a single connected component.

The horizontally splayed text is then output to the character cell generating means 38 for generating the character cells within each line of text. For each set of one or more vertically aligned (i.e. horizontally overlapping) connected components, a character cell enclosing the connected components is formed by the character cell generating means 38. The dimensions of each character cell will extend from the top position to the bottom position of the corresponding line of text, and from the leftmost position of the connected components of the character cell to the rightmost position of the connected components of the character cell, as shown in part (c) of FIG. 5.

A simplified flowchart of the operation of the script determining system set forth above is shown in FIG. 9. In step S100, the system starts, and the document is scanned in step S110 to generate the digital data signal. The digital image data signal is then cleaned-up by applying any desired preprocessing algorithms to the digital image data signal in step S120. In step 130, the connected components of the digital image data signal are identified and in step S140, the bounding boxes for each of the determined connected components are generated.

Next, in step S150, the text portion is vertically splayed. In step S160, the lines of text are identified from the splayed text. In step S170, the vertical profiles of each line are generated and the top, bottom, leftmost, rightmost baseline and (possibly) the x-line positions are determined. In step S180, the connected components and bounding boxes corresponding to each line are identified.

Then, in step S190, the each line of the text portion is horizontally splayed. In step S200, the modal stroke width is determined for each line, and in step S210 possible ligatures in the text portion are located. In step S220, the located ligatures are recursively split to their constituent independent connected components. In step S230, the character and word spaces within each line are identified. In step S240, the character cells of each line are identified and their dimensions determined. In step S250, the lists of character cells, corresponding bounding boxes and connected components are output. Then, in step S260, the process stops.

While the invention has been described with reference to particular preferred embodiments, the invention is not limited to the specific examples given, and other embodiments and modifications can be made by those skilled in the art without the departing from spirit and scope of the invention and claims.

What is claimed is:

1. An automatic text feature determining system for determining a text feature of an unsplayed text portion of an image of a document, the unsplayed text portion having at least two text lines separated by a first distance, comprising:
    input means for inputting a digital data signal representative of the unsplayed text portion, the digital data signal comprising a plurality of signal portions, each signal portion corresponding to one of a plurality of pixels of the image;
    connected component generating means for generating a plurality of connected components from the plurality of signal portions;
    bounding box generating means for generating a plurality of bounding boxes, each bounding box surrounding a corresponding one of the plurality of connected components; and
    line spatial feature determining means for determining spatial features of each line of text of the unsplayed text portion, each line of text comprising at least one of the plurality of connected components, the line spatial feature determining means comprising:
    vertical splaying means for vertically splaying the unsplayed text into a vertically splayed text portion, wherein the vertically splayed text portion has the at least two text lines separated by a second distance, the second distance being greater than the first distance, and
    vertical profile means for generating a vertical profile of the vertically splayed text portion.

2. The automatic text feature determining system of claim 1, wherein the line spatial feature determining means further comprises line content determining means for determining which ones of the plurality of connected components correspond to each line of the splayed text portion.

3. The automatic text feature determining system of claim 2, wherein the vertical profile means further comprises vertical position determining means for determining a top position and a bottom position and at least one of a baseline position and an x-line position based on the corresponding ones of the plurality of connected components for each line of the unsplayed text portion.

4. The automatic text feature determining system of claim 3, wherein the vertical position determining means determines the top and bottom positions of each at least one line based on transitions from zero to non-zero values, of the vertical profile corresponding to each line.

5. The automatic text feature determining system of claim 3, wherein the vertical profile means further comprises vertical profile generating means for generating a top position vertical profile of the top positions of the corresponding ones of the plurality of connected components and a bottom position vertical profile of the bottom positions of the corresponding ones of the plurality of connected components.

6. The automatic text feature determining system of claim 5, wherein the vertical profile means determines the x-line and baseline positions of each line of the unsplayed text from a peak of the top position and bottom position vertical profiles, respectively corresponding to each line.

7. An automatic text feature determining system for determining a text feature of an unsplayed text portion of an image of a document, comprising:
    input means for inputting a digital data signal representative of the unsplayed text portion, the digital data signal comprising a plurality of signal portions, each signal portion corresponding to one of a plurality of pixels of the image;
    connected component generating means for generating a plurality of connected components from the plurality of signal portions;
    bounding box generating means for generating a plurality of bounding boxes, each bounding box surrounding a corresponding one of the plurality of connected components; and
    line spatial feature determining means for determining spatial features of each line of text of the unsplayed text portion, each line of text comprising at least one of the plurality of connected components, the line spatial feature determining means comprising:

horizontal splaying means for horizontally splaying each line of the unsplayed text portion by horizontally separating the corresponding bounding boxes of each line of the unsplayed text portion to form a horizontally splayed text portion, horizontal overlaps of the bounding boxes in the unsplayed text portion being eliminated in the horizontally splayed text portion; and character cell generating means for generating at least one character cell within each line of the unsplayed text portion based on the horizontally splayed text portion, each character cell comprising a group of at least one vertically aligned connected component of the horizontally splayed text portion.

8. The automatic text feature determining system of claim 7, wherein the character cell generating means determines, for each character cell, a leftmost position of the corresponding group of at least one vertically aligned connected component and a rightmost position of the corresponding at least one vertically aligned connected component, wherein boundaries of each character cell of each line comprises the leftmost position and the rightmost position of the corresponding group of vertically aligned connected components and the top and bottom positions of the corresponding line.

9. The automatic text feature determining system of claim 7, wherein the line spatial feature determining means further comprises word spacing determining means for determining intraword and interword spacing, the word spacing determining means comprising:

means for determining a line beginning position and a line ending position;

means for determining sizes of spaces between connected components of each line of the splayed text;

means for determining a distribution of space sizes; and means for locating at least one peak in the space size distribution.

10. The automatic text feature determining system of claim 9, wherein the word spacing determining means further comprises:

means for determining whether each at least one peak for each line represents one of an interword space and an intraword space; and means for determining whether each at least one space in each line represents one of an interword space and intraword space, based on the corresponding peak determination.

11. An automatic text feature determining system for determining a text feature of an unsplayed text portion of an image of a document, comprising:

input means for inputting a digital data signal representative of the unsplayed text portion, the digital data signal comprising a plurality of signal portions, each signal portion corresponding to one of a plurality of pixels of the image;

connected component generating means for generating a plurality of connected components from the plurality of signal portions;

bounding box generating means for generating a plurality of bounding boxes, each bounding box surrounding a corresponding one of the plurality of connected components; and line spatial feature determining means for determining spatial features of each line of text of the unsplayed text portion., each line of text comprising at least one of the plurality of connected components, wherein the line spatial feature determining means further comprises:

stroke width determining means for determining a modal stroke width for each at least one line of text;

means for locating wide connected components having widths greater than a predetermined multiple of the modal stroke width for the corresponding line;

means for generating a cost distribution for each wide connected component;

means for locating minima within the cost distributions, each cost distribution corresponding to a predetermined portion of one of the wide connected components; and means for splitting each wide connected component for which at least one minimum is located into two independent connected components of the unsplayed text portion.

12. The automatic text feature determining system of claim 11, wherein the predetermined multiple is 3.

13. The automatic text feature determining system of claim 11, wherein the predetermined portion of each wide connected component extends from a first point to a second point, wherein the first point is located by adding a second predetermined multiple of the modal stroke width to a leftmost position of the wide connected component and the second point is located by subtracting the second predetermined multiple of the average stroke width from a rightmost position of the wide connected component.

14. The automatic text feature determining system of claim 13, wherein the second predetermined multiple is 1.5.

15. The automatic text feature determining system of claim 11, wherein the minimum is less than a predetermined value.

16. The automatic text feature determining system of claim 15, wherein the predetermined value is equal to the modal stroke width.

17. The automatic text feature determining system of claim 11, wherein the horizontal splaying means generates the cost distribution by ANDing adjacent columns of the bounding box corresponding to the wide connected component.

18. A method for automatically determining text features of an unsplayed text portion of an image of a document, the unsplayed text portion having at least two text lines separated by a first distance, comprising the steps of:

inputting a digital data signal representative of the unsplayed text portion, the digital data signal comprising a plurality of signal portions, each signal portion corresponding to one of a plurality of pixels of the image;

generating a plurality of connected components from the plurality of signal portions;

generating a plurality of bounding boxes, each bounding box surrounding a corresponding one of the plurality of connected components;

determining spatial features of each line of text of the unsplayed text portion, each line of text comprising at least one of the plurality of connected components;

vertically splaying the unsplayed text portion into a vertically splayed text portion, wherein the vertically splayed text portion has the at least two text lines separated by a second distance, the second distance being greater than the first distance; and generating a vertical profile of the vertically splayed text portion.

19. The method for automatically determining text features of claim 18, wherein the step of vertical splaying comprises the step of determining which ones of the plurality of connected components correspond to each line of the text portion.

20. The method for automatically determining text features of claim 19, wherein the step of generating the vertical profile comprises the step of determining, for the text portion, a top position and a bottom position and at least one of a baseline position and an x-line position based on the corresponding ones of the plurality of connected components for each line.

21. The method for automatically determining text features of claim 20, wherein the step of determining determines the top and bottom positions of each line from a maximum peak and a minimum peak, respectively of the vertical profile corresponding to each line.

22. The method for automatically determining text features of claim 20, wherein the step of generating the vertical profile further comprises the step of generating a top position vertical profile of the top positions of the corresponding ones of the plurality of connected components and a bottom position vertical profile of the bottom positions of the corresponding ones of the plurality of connected components.

23. The method for automatically determining text features of claim 20, wherein the step of determining determines the x-line and baseline positions of each line from a peak of the top position and bottom position vertical profiles, respectively corresponding to each line.

24. A method for automatically determining text features of an unsplayed text portion of an image of a document, comprising the steps of:
inputting a digital data signal representative of the unsplayed text portion, the digital data signal comprising a plurality of signal portions, each signal portion corresponding to one of a plurality of pixels of the image;
generating a plurality of connected components from the plurality of signal portions;
generating a plurality of bounding boxes, each bounding box surrounding a corresponding one of the plurality of connected components;
determining spatial features of each line of text of the unsplayed text portion, each line of text comprising at least one of the plurality of connected components;
horizontally splaying each line of the unsplayed text portion by horizontally separating the corresponding bounding boxes of each line of the unsplayed text portion to form a horizontally splayed text portion, horizontal overlaps of the bounding boxes in the unsplayed text portion being eliminated in the horizontally splayed text portion; and
generating at least one character cell of each line of the unsplayed text portion based on the horizontally splayed text portion, each character cell comprising a group of at least one vertically aligned connected component of the horizontally splayed text portion.

25. The method for automatically determining text features of claim 24, wherein the step of generating character cells comprises the step of determining, for each character cell, a leftmost position of the corresponding group of at least one vertically aligned connected component and a rightmost position of the corresponding at least one vertically aligned connected component, wherein boundaries of each character cell of each line comprises the leftmost position and the rightmost position and the top and bottom positions of the corresponding line.

26. The method for automatically determining text features of claim 24, wherein the step of determining space widths comprises the steps of:
determining a line beginning position and a line ending position;
determining sizes of spaces between connected components of each line of the splayed text;
determining a distribution of space sizes; and
locating at least one peak in the space size distribution.

27. The method for automatically determining text features of claim 26, wherein the step of determining space widths further comprises the steps of:
determining whether each at least one peak for each line represents one of an interword space and an intraword space; and
determining whether each at least one space in each line represents one of an interword space and intraword space, based on the corresponding peak determination.

28. A method for automatically determining text features of an unsplayed text portion of an image of a document, comprising the steps of:
inputting a digital data signal representative of the unsplayed text portion, the digital data signal comprising a plurality of signal portions, each signal portion corresponding to one of a plurality of pixels of the image;
generating a plurality of connected components from the plurality of signal portion;
generating a plurality of bounding boxes, each bounding box surrounding a corresponding one of the plurality of connected components;
determining spatial features of each line of text of the unsplayed text portion, each line of text comprising at least one of the plurality of connected components;
determining a modal stroke width for each at least one line of text;
locating wide connected components having widths greater than a predetermined multiple of the modal stroke width for the corresponding line;
generating a cost distribution for each wide connected component;
locating cost minima within the cost distributions, each cost distribution corresponding to a predetermined portion of one of the wide connected components: and
splitting each wide connected component for which at least one cost minimum is located into two independent connected components.

29. The method for automatically determining text features of claim 28, wherein the predetermined multiple is 3.

30. The method for automatically determining text features of claim 29, wherein the predetermined portion of each wide connected component extends from a first point to a second point, wherein the first point is located by adding a second predetermined multiple of the modal stroke width to a leftmost position of the wide connected component and the second point is located by subtracting the second predetermined multiple of the average stroke width from a rightmost position of the wide connected component.

31. The method for automatically determining text features of claim 30, wherein the second predetermined multiple is 1.5.

32. The method for automatically determining text features of claim 28, wherein the minimum is less than a predetermined value.

33. The method for automatically determining text features of claim 32, wherein the predetermined value is equal to the modal stroke width.

34. The method for automatically determining text features of claim 28, wherein the step of generating the cost distribution comprises ANDing adjacent columns of the bounding box corresponding to the wide connected component.

* * * * *